(12) United States Patent  
Frederick et al.

(10) Patent No.: US 8,315,143 B2  
(45) Date of Patent: Nov. 20, 2012

(54) VINYL RECORD TURNTABLE HAVING INTEGRATED DOCKING STATION FOR A PORTABLE MEDIA PLAYER

(75) Inventors: Mark A. Frederick, Bristol, RI (US); John E. O'Donnell, Barrington, RI (US)

(73) Assignee: inMusic Brands, Inc., Cumberland, RI (US)

( * ) Notice: Subject to any disclaimer, the term of this patent is extended or adjusted under 35 U.S.C. 154(b) by 908 days.

(21) Appl. No.: 11/957,834

(22) Filed: Dec. 17, 2007

(65) Prior Publication Data

US 2008/0144478 A1     Jun. 19, 2008

Related U.S. Application Data

(60) Provisional application No. 60/870,632, filed on Dec. 19, 2006, provisional application No. 60/974,093, filed on Sep. 21, 2007.

(51) Int. Cl.  
    *G11B 25/00*     (2006.01)
(52) U.S. Cl. ...................................................... 369/264
(58) Field of Classification Search ........................ None  
    See application file for complete search history.

(56) References Cited

U.S. PATENT DOCUMENTS

| | | | |
|---|---|---|---|
| 4,473,898 A | | 9/1984 | Ono |
| 7,627,343 B2 * | 12/2009 | Fadell et al. ................. 455/557 |
| 2003/0206506 A1 * | 11/2003 | Cohen ......................... 369/47.23 |
| 2005/0152236 A1 * | 7/2005 | Wardle ........................ 369/39.01 |
| 2005/0259532 A1 * | 11/2005 | Roman et al. ................ 369/47.1 |
| 2005/0270926 A1 * | 12/2005 | Mazur et al. ................ 369/47.1 |
| 2006/0221776 A1 * | 10/2006 | Roman et al. ..................... 369/1 |
| 2007/0015457 A1 * | 1/2007 | Krampf et al. .............. 455/3.06 |
| 2007/0070856 A1 * | 3/2007 | Tebele ............................. 369/85 |
| 2007/0087725 A1 * | 4/2007 | Anderson ...................... 455/348 |
| 2007/0247794 A1 * | 10/2007 | Jaffe et al. ..................... 361/681 |
| 2007/0254695 A1 * | 11/2007 | Langberg et al. .......... 455/556.1 |
| 2008/0013756 A1 * | 1/2008 | Roman et al. ................ 381/119 |
| 2008/0243279 A1 * | 10/2008 | Sherman ......................... 700/94 |

FOREIGN PATENT DOCUMENTS

KR    10-2005-0049787 A    5/2005

* cited by examiner

*Primary Examiner* — Joseph Feild  
*Assistant Examiner* — Henok Heyi  
(74) *Attorney, Agent, or Firm* — Barlow, Josephs & Holmes, Ltd.

(57) ABSTRACT

An improved disc jockey turntable is disclosed. The turntable includes a housing having an I/O circuit, an audio output electrically connected to the I/O circuit, a rotatable platter configured and arranged to received a vinyl record thereon, an electric motor is configured to selectively rotate the platter, a movable tonearm with a pickup cartridge is electrically connected to the I/O circuit whereby the tonearm may be moved over the platter and placed on a vinyl record rotating on the platter to play audio out through the audio output. A dock is located on the housing and is configured to cradle a portable music player. The dock has a communication port for connecting to the portable music player. A control circuit is electrically connected to the communication port and the I/O circuit, and is configured to selectively recording audio from the I/O circuit to the portable music player.

19 Claims, 3 Drawing Sheets

VINYL RECORD TURNTABLE HAVING INTEGRATED DOCKING STATION FOR A PORTABLE MEDIA PLAYER

CROSS-REFERENCES TO RELATED APPLICATIONS

The present application claims priority to earlier filed U.S. Provisional Patent Application Ser. No. 60/870,632, filed on Dec. 19, 2006, and U.S. Provisional Patent Application Ser. No. 60/974,092, filed on Sep. 21, 2007, the entire contents of which are incorporated by reference.

BACKGROUND OF THE INVENTION

1. Field of the Invention

The present invention relates generally to vinyl record turntables and more specifically to such a turntable that includes an integrated docking station for a portable media player such as an iPod®.

2. Background of the Related Art

Vinyl record turntables are well known in the art. Such turntables include a rotating platter to spin a vinyl record and a tone arm with a pickup cartridge. When the pickup cartridge is placed on the surface of a vinyl record being rotated by the platter, the audio signal encoded on the surface of the vinyl record is translated into an electrical signal, which is transmitted out of an output and subsequently into an audible sound through an amplifier and/or speakers.

Portable media players are quite popular currently for playing audio and video recordings of all sorts. Many portable media players have a recording feature built-in and some even include built-in microphones. However there is no convenient method of transporting the audio signal of a vinyl record onto a portable media player, such as an iPod®, without the use of cables or other intervening devices.

Therefore, there is a need within the industry for a record turntable that has the capability of transferring an audio signal of a vinyl record onto a portable media player.

SUMMARY OF THE INVENTION

The present invention solves the problems of prior to providing a disc jockey turntable that has an integrated docking station for a portable media player. The turntable of the present invention can record audio recordings directly from the vinyl records and onto the portable media player and also play recordings from the portable media player out of the line outputs of the turntable. Additionally other audio devices may be attached to the turntable of the present invention, and subsequently recorded onto the portable media player.

BRIEF DESCRIPTION OF THE DRAWINGS

These and other features, aspects, and advantages of the present invention will become better understood with reference to the following description, accompanying drawings and claims where:

DESCRIPTION OF THE PREFERRED EMBODIMENT

Figure 1:
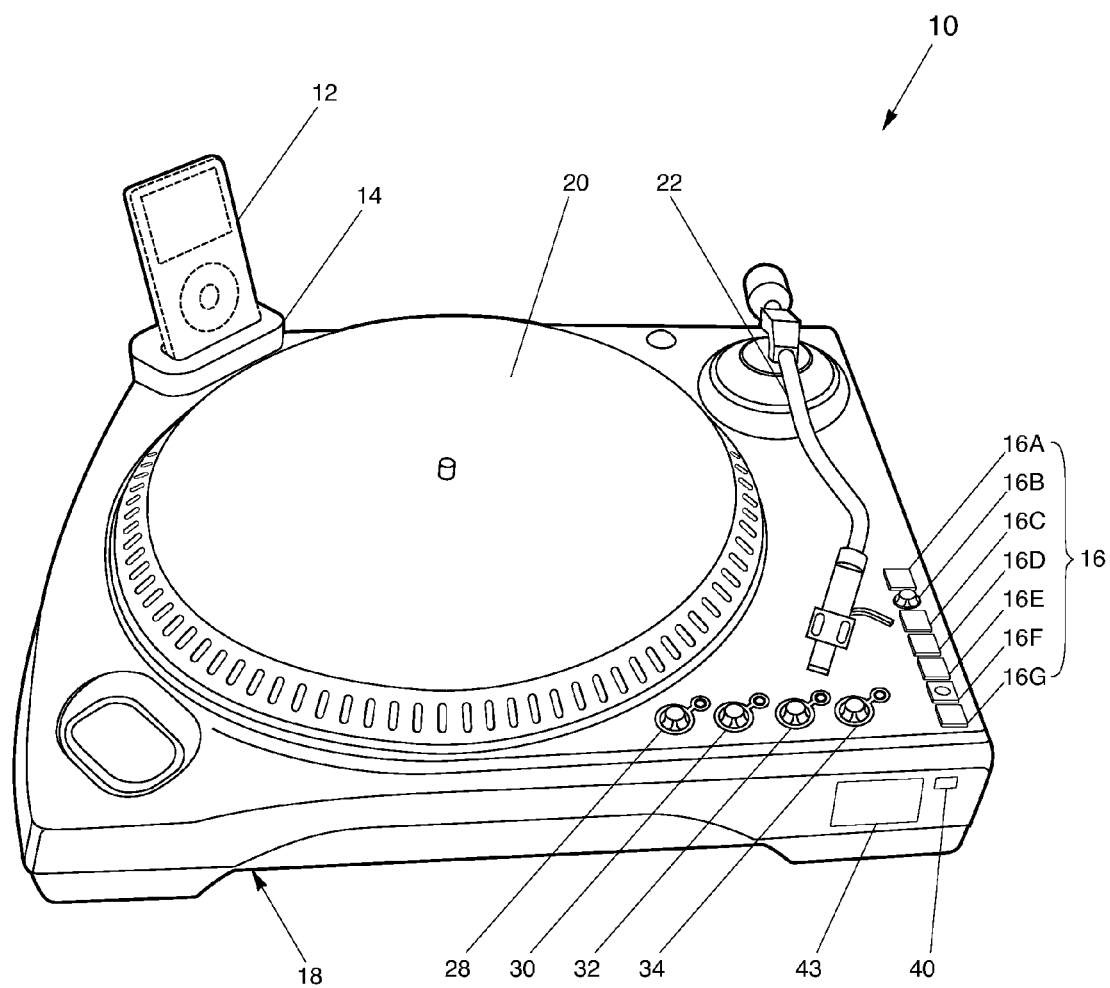
FIG. 1 is a perspective view of the turntable of the present invention.
Figure 2:
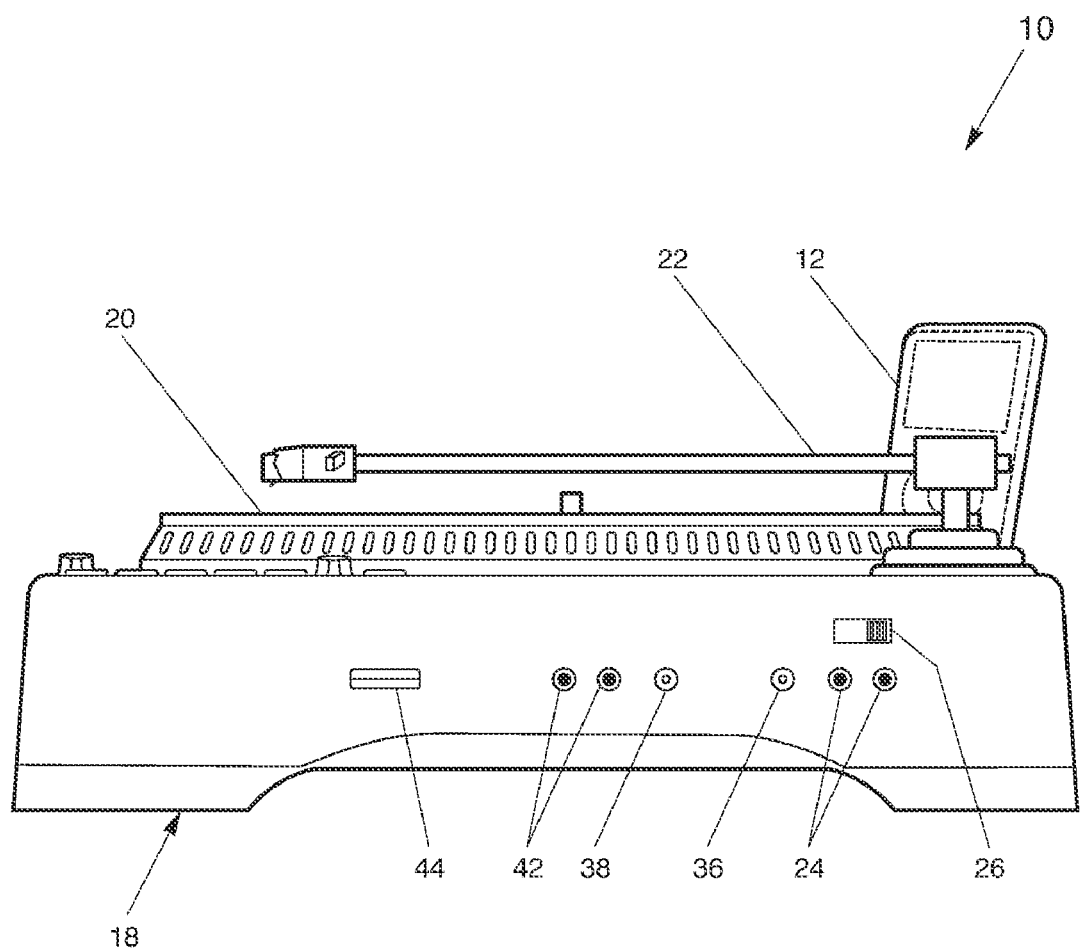
FIG. 2 is a side view of the turntable of the present invention.

Referring to FIGS. 1 and 2, the turntable of the present invention is shown generally at 10. A portable media player is 12 shown docked to a docking station 14. The turntable 10 of the present invention includes an integrated docking station 14, which may also include optional transport controls 16 to control the function of the portable media player 12.

The turntable 10 has a turntable body 18 with a rotating platter 20. The rotating platter 20 may be driven by a direct drive motor or a belt drive motor. Preferably the platter speed can be set at speed of 33, 45 or 78 rpm, respectively, and also reverse. Carry handles (not shown) are also integrated into the turntable body 10.

The turntable body 10 also has tone arm 22 with a pickup cartridge. The tone arm 22 is pivotally connected to the turntable body 10 and is for converting the audio signal encoded on a rotating vinyl record into an electrical signal. The electrical signal may be subsequently transmitted out a pair of RCA line outputs 24.

The RCA line outputs 24 are selectable between phono or line level output and a phono/line level switch 26 is also included to set the RCA line outputs at the desired level.

The turntable of the present invention may also optionally include a pitch control 28, tone control 30, a gain control 32, and/or a volume control 34 to adjust these respective properties of the electrical signal.

The electrical signal generated by the tone arm 22 may also be routed directly to the docking station 14 and the portable media player 12 in the lieu of or in addition to the RCA line outputs 24. To record the audio signal of the vinyl record, the user of the turntable 10 selects the docking station 14 as the desired output and selects a record function on either the transport controls 16 or the portable media player 12 itself. The user then begins to play the vinyl record. The portable media player 12 then records the electrical signal output of the tone arm 22. In this manner, the audio signal of a vinyl record may be transferred to the portable media device 12.

It is envisioned that the turntable 10 of the present invention can be made in two versions. In a first embodiment, the turntable lacks transport controls for the portable media player 12. On this embodiment, an operator of the turntable 10 uses the controls of the portable media player 12 itself to select and play or to record audio therefrom.

An optional set of transport controls 16 is included on the turntable body 18 itself. These transport controls 16 control the functions of the portable media player 12 and can be used instead of the often small, if not diminutive, controls on the portable media player 12. The transport controls 16 may include a menu button 16a, selector knob 16b, enter button 16c, previous track button 16d, next track button 16e, record button 16f, and play/pause button 16g. The buttons are preferably configured as tact switches to reduce or prevent noise from "leaking" into the performance or a recording. The selector knob 16g may be rotated and pressed to navigate the menus on the portable media device 12. To facilitate this functionality to control the portable media player 12, an onboard microprocessor coupled to serial communication electronics is included in the turntable body 18.

The turntable of the present invention may also include a remote start jack 36 and an external digital output 38. The remote start jack 36 allows the turntable to remotely started or stopped by foot switch or other "lock switch"-based device. The external digital output 38 allows the turntable to be connected to other digital devices.

The turntable 10 of the present invention also includes an optional remote sensor 40 that may be used with remote control (not shown). The remote control has a similar interface controls as the turntable to enable a user to operate the turntable and portable media player from a distance.

A pair of RCA line inputs 42 is also included to allow an external audio device having an audio signal to be connected to the turntable 10 of the present invention and have its audio signal subsequently recorded on to the portable media player 12.

The turntable 10 of the present invention may also include an internal CD player or an internal tape deck. These optional devices, if included, may also have audio signals transferred to the portable media player 12. In addition to the CD player or tape deck, the turntable 10 the present invention may also include a mass storage device such as an internal or external hard drive or flash drive.

The turntable 10 a present invention may also include a display 43 that includes a number of indicators. These indicators provide information to the user about such functions as beats per minute, the platter 20 motor speed setting, and other independent functions such as the current settings of the pitch control 28, gain control 32, volume control 34 and tone control 30 of the turntable 10.

Also included on the turntable 10 of the present invention is a USB port 44. The USB port 44 allows a personal computer to be connected to the turntable 10 to allow the docking station 14 to be able to synchronize the portable music player 12 with the personal computer.

Figure 3:
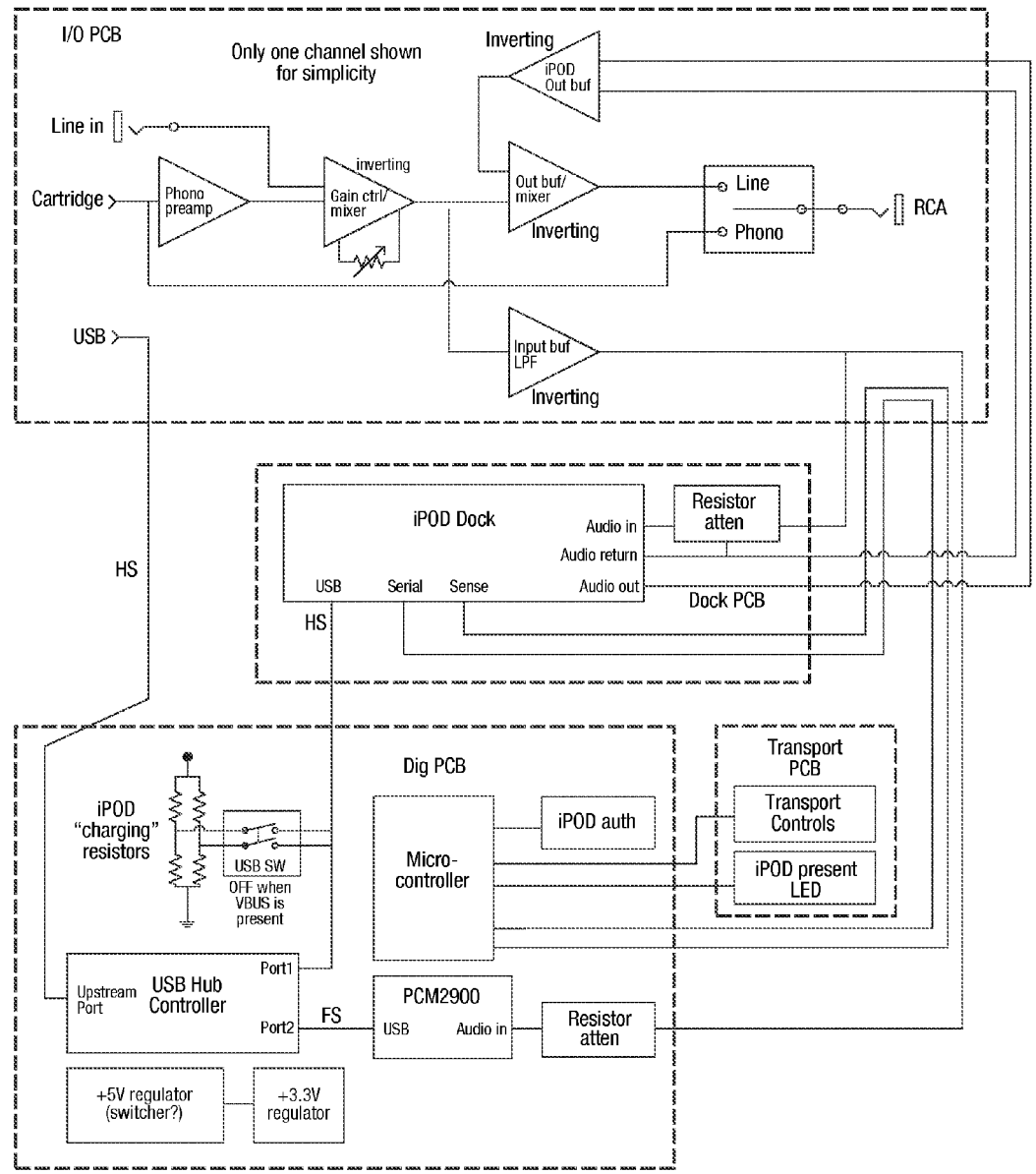
FIG. 3 is a flow diagram of the operation of the turntable of the present invention.

Referring now to FIG. 3, a circuit diagram of the turntable of the present invention is shown generally. The circuit is generally divided into four logical blocks or components, indicated by the heavy dashed lines: the I/O PCB, the docking station PCB, the Transport PCB, and the Digital PCB. In general, the Digital PCB components include the microcontroller and USB port circuitry; the Transport PCB includes the optional transport controls 16 to control the portable media player 12; the docking station PCB includes the electrical connections for the docking stations 14; and the I/O PCB includes the circuitry for the audio and data input and output of the turntable 10.

The transport controls 16 are electrically connected to the microcontroller. Optionally, an indicator, such as an LED, may be included to signify whether a portable media player 12 is properly docked in the docking station 14. Also included within the Digital PCB logical block is a USB controller, which includes three ports. One port is connected to the docking station 14, a second is connected to a pulse-code modulator, and a third port is located on the housing 18 and includes a standard USB port 44 to connect any type of USB compatible device thereto. A charging circuit for the docking station 14 is also included and is configured to detect when a portable media device 12 is docked in the docking station 14.

The docking station PCB includes a USB connection for the portable media player, which connects to a charging circuit and USB controller logically located in the Digital PCB circuit. The docking station 14 itself contains an audio input an audio return and an audio output. Additionally, the docking station 14 includes a serial connection and sense connection, which are electrically connected to the microcontroller. Operation of the transport controls 16 transmits signals to the microcontroller, which, in turn, transmits control signals to the serial input to the docking station 14 and, subsequently, the portable media player 12 connected thereto. The control signals are used to navigate the menu selections of portable media player 12 and operate any functions thereof, such as playing audio files stored on the portable media player 12.

The I/O PCB includes the inputs for the turntable 10 of the present invention, namely, the line input 42, cartridge and USB port 44. The signal from the line input 42 is first passed through a gain control and mixer circuit. The signal from the cartridge may be passed through a phono pre-amp circuit prior to being passed through the gain control and mixer. The gain control and mixer circuit may be selectively set to either the line input or cartridge signal input. The resulting signal is then fed into an output buffer, where it may be further mixed or sent to an input buffer, which will be further described below.

If the output buffer is selected, the signal may then be transmitted out the RCA outputs 24 or digital output 38 of the turntable 10. The output buffer is also electrically connected to the analog digital converter and the docking station 12 through the dock output buffer. The dock output buffer includes two inputs that are electrically connected to the audio return and the audio output of the docking station 14. The input buffer is electrically connected to the audio input of the docking station 14 and the audio input of the pulse-code modulator, thus permitting audio output to be transferred from the line input 42 or cartridge to a mass storage device connected to the USB port 44.

Additionally, the cartridge signal may bypass the gain control and mixer circuit and output buffer, and be directly channeled to the RCA outputs 24 as a raw phono output signal. If the input buffer is selected, the signal may be sent to the docking station or the pulse-code modulator connected to the USB controller. This feature permits music tracks to be "ripped" to portable media player 12 or another separate mass storage device connected to the USB port 44.

Therefore, it can be seen that the present invention provides a unique solution to the problems of the prior art by providing a turntable 10 that has an integrated docking station for a portable media player 12. By including a docking station 14 integrated in with the turntable 10, the audio of the vinyl record may be directly recorded onto a portable media player 12, such as an iPod®. In addition, the use of additional line inputs 42 allows other audio devices to be recorded onto the portable media player 12 too.

It would be appreciated by those skilled in the art that various changes and modifications can be made to the illustrated embodiments without departing from the spirit of the present invention. All such modifications and changes are intended to be within the scope of the present invention.

What is claimed is:

1. A disc jockey turntable, comprising:
   a housing having an I/O circuit, an audio output electrically connected to said I/O circuit, a rotatable platter configured and arranged to receive a standard vinyl record thereon, an electric motor configured and arranged to selectively rotate said platter, a movable tonearm having a pickup cartridge electrically connected to said I/O circuit whereby the tonearm may be moved over the platter and placed on a vinyl record rotating on said platter to play audio out through said audio output;
   a dock on the housing configured to cradle a portable music player, said dock having a communication port for said portable music player;
   a control circuit electrically connected to said communication port and said I/O circuit for selectively recording audio from said I/O circuit to said portable music player; and
   a set of transport controls on the housing and electrically connected to said control circuit for selectively and directly controlling functions of said portable music player, the set of transport controls comprising a record button.

2. The apparatus of claim 1, wherein the set of transport controls are selected from the group consisting of: play, pause, play/pause, menu, menu selection knob, enter, previous track, next track, and record.

3. The apparatus of claim 1, wherein said control circuit is configured and arranged to selectively play audio from said portable music player through said audio output.

4. The apparatus of claim 1, further comprising:
a charging circuit electrically connected to said dock for charging a battery of said portable music player.

5. The apparatus of claim 1, further comprising:
an indicator lamp configured and arranged to indicate that said portable music player is properly seated in said dock.

6. The apparatus of claim 1, wherein the audio output is a pair of RCA line outputs.

7. The apparatus of claim 1, further comprising a digital input output port electrically connected to the I/O circuit.

8. The apparatus of claim 7, wherein the digital input output port is a USB port.

9. The apparatus of claim 1, further comprising:
a compact disc player in said housing and electrically connected to said I/O circuit.

10. The apparatus of claim 1, further comprising:
a tape deck in said housing and electrically connected to said I/O circuit.

11. The apparatus of claim 1, further comprising:
a hard disc in said housing and electrically connected to said I/O circuit.

12. The apparatus of claim 1, further comprising:
a pitch control on the housing and electrically connected to said I/O circuit for adjusting the pitch of the audio playing through the audio output.

13. The apparatus of claim 1, further comprising:
a gain control on the housing and electrically connected to said I/O circuit for adjusting the gain of the audio playing through the audio output.

14. The apparatus of claim 1, further comprising:
a tone control on the housing and electrically connected to said I/O circuit for adjusting the tone of the audio playing through the audio output.

15. The apparatus of claim 1, further comprising:
a volume control on the housing and electrically connected to said I/O circuit for adjusting the volume of the audio playing through the audio output.

16. The apparatus of claim 1, further comprising a remote start connector configured and arranged to start the turntable playing upon receiving a signal thereto.

17. The apparatus of claim 1, further comprising an electric motor speed selector settable to 33, 45 and 78 rpm.

18. The apparatus of claim 1, further comprising a display on the housing configured and arranged to indicate the settings of the control circuit and characteristics of the audio playing through the audio output.

19. The apparatus of claim 7, wherein said portable music player may be synchronized with a personal computer.

* * * * *